(12) United States Patent
Rondeau et al.

(10) Patent No.: US 9,778,362 B2
(45) Date of Patent: Oct. 3, 2017

(54) RELATIVE SPEED MEASURING DOPPLER LIDAR

(71) Applicant: THALES, Courbevoie (FR)

(72) Inventors: Philippe Rondeau, Allex (FR); Jean-Pierre Schlotterbeck, Rochefort-Samson (FR); Xavier Lacondemine, Alixan (FR)

(73) Assignee: Thales, Courbevoie (FR)

(*) Notice: Subject to any disclaimer, the term of this patent is extended or adjusted under 35 U.S.C. 154(b) by 535 days.

(21) Appl. No.: 14/734,989

(22) Filed: Jun. 9, 2015

(65) Prior Publication Data
US 2016/0170023 A1   Jun. 16, 2016

(30) Foreign Application Priority Data
Jun. 13, 2014 (FR) ..................................... 14 01344

(51) Int. Cl.
*G01S 17/58* (2006.01)
*G01P 5/26* (2006.01)
(Continued)

(52) U.S. Cl.
CPC ............... *G01S 17/58* (2013.01); *G01P 5/26* (2013.01); *G01S 7/4917* (2013.01);
(Continued)

(58) Field of Classification Search
CPC ... G01S 17/58; G01S 7/4917; H04B 10/5161; H04B 10/503; H04B 10/0795; G01P 5/26
See application file for complete search history.

(56) References Cited

U.S. PATENT DOCUMENTS 2,738,502 A * 3/1956 Bose .................... G01S 1/02
                                                      342/109
6,608,669 B2   8/2003 Holton
(Continued)

FOREIGN PATENT DOCUMENTS

FR   2870004 A1   11/2005
FR   2965064 A1    3/2012
(Continued)

OTHER PUBLICATIONS

Search Report issued in French application No. 1401344, dated Mar. 9, 2015 (8 pages).

*Primary Examiner* — Daniel Pihulic
(74) *Attorney, Agent, or Firm* — Davis Wright Tremaine LLP; Michael J. Donohue

(57) ABSTRACT

The general field of the invention is that of Doppler lidars intended to measure the speed of a target. The lidar according to the invention comprises:
First means for modulating the optical frequency of the transmission signal, said frequency being the sum of a constant frequency and of a variable frequency of determined amplitude modulated by a periodic temporal function;
Second means for computing the spectrum of the measured heterodyne signal and for creating two measurement spectra obtained by shifting the spectrum of the heterodyne signal by a positive and negative frequency value, said realignment frequency equal to the difference between the instantaneous frequency of the transmission signal and the frequency of a signal transmitted at a time shifted by the round-trip travel time between the lidar and the target;
Third means for comparing the two measurement spectra, the difference in amplitude between the two spectra at the Doppler frequency determining the direction of the speed of the target.

7 Claims, 4 Drawing Sheets

(51) Int. Cl.
*G01S 7/491* (2006.01)
*H04B 10/079* (2013.01)
*H04B 10/50* (2013.01)
*H04B 10/516* (2013.01)

(52) U.S. Cl.
CPC ....... *H04B 10/0795* (2013.01); *H04B 10/503* (2013.01); *H04B 10/5161* (2013.01)

(56) References Cited

U.S. PATENT DOCUMENTS

| | | |
|---|---|---|
| 6,621,561 B2 | 9/2003 | Holton |
| 2005/0083513 A1 | 4/2005 | Rogers |
| 2016/0170023 A1* | 6/2016 | Rondeau ................ G01S 17/58 398/25 |

FOREIGN PATENT DOCUMENTS

| | | | | |
|---|---|---|---|---|
| FR | 3022349 A1 | * | 12/2015 | ............. G01S 17/58 |
| FR | EP 2955542 A1 | * | 12/2015 | ............. G01S 17/58 |

* cited by examiner

RELATIVE SPEED MEASURING DOPPLER LIDAR

BACKGROUND OF THE INVENTION

Field of the Invention

The field of the invention is that of Doppler anemometry that requires a knowledge of either the direction of the wind speed, or that of the speed of the carrier of the anemometer when the latter is mounted on a vehicle. More specifically, the field of application is aeronautics and, even more specifically, that of helicopters.

Description of the Related Art

The current anemometric systems of helicopters are, just like those of aeroplanes, based on measurements of total pressure by Pitot probes and of static pressure. These systems are, however, ill suited to the needs of helicopters because they do not make it possible to cover all of their flight domain. On the one hand, the air speed measurement is unavailable at low speed, up to approximately 35 knots, because of the disturbances generated by the flux from the rotor. On the other hand, the anemo-barometric systems of helicopters do not provide the three components of the speed vector but essentially its component on the longitudinal axis of the carrier.

The Doppler "lidar", LiDAR standing for "Light Detection And Ranging", partly resolves these various inadequacies. Indeed, it makes it possible to perform a remote speed measurement, from outside the flux of the rotor of the helicopter, without having to use a nose probe. The use of a plurality of laser beams or of a beam scanning system makes it possible to access the three components of the air speed vector throughout the whole flight domain of the carrier.

The signal from the simple homodyne Doppler lidar, which corresponds to the beat between a wave backscattered by the atmospheric particles and a copy of the transmitted wave, gives access only to the absolute value of the projection of the speed vector along the measurement axis and the information concerning the sign of the speed is then lost. In practice, since the heterodyne signal is real, its spectrum, obtained as the square of the modulus of its Fourier transform, is even in frequency and there is no way to determine whether the measured Doppler shift is positive or negative.

On an aeroplane, this does not pose any particular problem in as much as it is possible to find configurations of the sight axes for which the sign of the speed is always the same throughout the flight domain. On the other hand, given the capabilities of the helicopter to move in all directions, but also the need to perform a measurement of the modulus and of the orientation of the surface wind, it is vitally important to have a signed speed measurement.

There are various solutions for determining the sign of the speed. The use of an acoustic-optic modulator or "AOM" makes it possible to shift the frequency of the transmitted optical wave or, in an equivalent manner, of the local oscillator, such that, at zero speed, the beat between the backscattered wave and the local oscillator is no longer at zero frequency but shifted by a frequency $f_{AOM}$. For example, for a lidar operating in the near infrared at the wavelength of 1.55 μm, it is common practice to choose an AOM that provides a shift of 40 MHz. The frequency range covered by the frequencies lying between 0 Hz and 40 MHz then corresponds to the negative speeds of around −30 m/s to 0 m/s and the frequencies beyond the frequency $f_{AOM}$ correspond to the positive speeds.

The use of an acousto-optic modulator does however present a number of drawbacks:

Reliability: the acousto-optic modulator is a fragile component, notably in a severe thermal and vibratory environment and is not therefore suited to the aeronautical environment;

Cost: the cost of the acousto-optic modulator is high relative to the cost of the optical architecture as a whole;

Increased frequency range. For a symmetrical speed range, the Doppler frequency range to be analyzed is doubled, the computation power needed at the processing level is commensurately increased.

FIG. 1 represents an optical architecture of "CW", or "Continuous Wave", type with acousto-optic modulator.

A laser source 10 transmits an optical wave of frequency $v_L$ or of wavelength $\lambda_L$. The latter is shifted in frequency by means of the modulator 11, passes through the optical splitter 12 and then is focused in the atmosphere using a transmission-reception telescope 13. The wave backscattered by the particles P naturally present in the air is shifted in frequency by Doppler effect by a quantity $f_D$ carrying speed information V on the axis of the laser beam. The conventional relationship $f_D = 2 \cdot V / \lambda_L$ applies or:

$$V = f_D \cdot \lambda / 2$$

The beat between this backscattered wave and the local oscillator produced by the interferometer 14 is detected by the photodetector 15 and produces an electrical signal of frequency $f_{MAO} + f_D$. A spectral analysis by processing means 16 which can, for example, be an averaged periodogram, makes it possible to bring out the noise signal and extract the frequency information.

A different device makes it possible to access the sign of the speed without having to use an acousto-optic modulator. It is represented in FIG. 2. The principle of operation consists in modulating the frequency of a laser source 20 by means of a frequency ramp generator 21. This device makes it possible to measure both the speed $V = f_D \cdot \lambda / 2$ and the distance D separating the target from the anemometer.

α and −α are used to denote the slopes of the frequency ramps of the ramp generator. The device comprises a transmission-reception channel comprising a splitter 22, an amplifier 23, a circulator 24 and a transmission-reception telescope 25. The device also comprises a reference channel comprising a first delay line 26, a second splitter 27, a third splitter 28, a second delay line 29, a first interferometer 30 and a first detector 31. Finally, the device comprises a measurement channel comprising a second interferometer 32 and a second detector 33. By separately processing the signals from frequency ramps of slope +α and −α, the measurement channel is used to respectively measure the frequencies $$f_+ = \left| f_D - \frac{2\alpha D}{c} \right| \text{ and } f_- = \left| f_D + \frac{2\alpha D}{c} \right|.$$

By way of example, if the slope α is 6 MHz/μs, if the distance D is 25 m, then $$\frac{2 \cdot \alpha \cdot D}{c} = 1 \text{ MHz}.$$

If the speed is positive, then the Doppler shift is +5 MHz, the frequency $f_+$ is 4 MHz and the frequency $f_-$ is 6 MHz. Conversely, if the speed is negative, then the Doppler shift is −5 MHz, the frequency $f_+$ is 6 MHz and the frequency $f_-$ is 4 MHz. Thus, it is possible to retrieve, by comparing the difference between the frequencies $f_+$ and $f_-$, not only the value of the speed, but its sign. The difference between the two frequencies is representative of the distance to the object.

This type of device does however present a number of drawbacks. Among others, it requires the use of specific laser sources, with a waveform that is well controlled and monitored by means of an additional detection channel, thus increasing the number of components needed.

SUMMARY OF THE INVENTION

The lidar according to the invention does not present these drawbacks. More specifically, the subject of the invention is a Doppler lidar intended to measure the speed of a target, said lidar comprising at least one laser source transmitting an optical signal, optical means for transmitting said optical signal and for receiving an optical signal backscattered by said target illuminated by said optical signal, and heterodyne detection means making it possible to make the transmission optical signal and the backscattered optical signal beat and measure the beat frequency of the beat heterodyne signal, said beat frequency comprising a peak at the so-called Doppler frequency representative of the absolute speed of the target relative to the lidar, characterized in that the lidar comprises:

First means for modulating the optical frequency of the optical signal so that said frequency is the sum of a constant frequency and of a variable frequency of determined amplitude modulated by a periodic temporal function;

Second means making it possible to compute the spectrum of the measured heterodyne signal and create two measurement spectra, the first spectrum and the second spectrum being obtained by shifting the spectrum of the measured heterodyne signal by a positive and negative frequency value, said realignment value being equal to the frequency difference between the instantaneous frequency of the transmission signal and the frequency of a transmission signal transmitted at a time shifted by the round-trip travel time between the lidar and the target;

Third means for comparing the two measurement spectra, the difference in amplitude between the two spectra at the Doppler frequency making it possible to determine the direction of the speed of the target.

Advantageously, the second means comprise:

A first stage for measuring the reception heterodyne signal comprising the following means:

An analogue-digital converter;
An observation window of determined duration limiting the duration of the digital heterodyne signal;
Means making it possible to perform the Fourier transform of the digital heterodyne signal and compute the square of its modulus to obtain its spectrum;

A second stage for processing the digital spectrum obtained from the first stage comprising the following means:

Two analysis chains arranged in parallel, each chain ensuring the functions of realignment of the spectrum by a positive or negative frequency value, of accumulation of a determined quantity of digital signals and of estimation of the Doppler frequency and of the amplitude of the peak corresponding to said Doppler frequency;
Means for computing the value of the speed of the target and direction relative to the lidar.

Advantageously, the second means comprise:

An analogue-digital converter;
An observation window of determined duration limiting the duration of the digital heterodyne signal;
Means making it possible to multiply the digital heterodyne signal by a complex exponential function of which the exponent is proportional to the realignment value to obtain a complex digital signal;
Means making it possible to perform the Fourier transform of the complex digital signal and compute the square of its modulus to obtain its spectrum;
An analysis chain ensuring the functions:
Of accumulation of a determined quantity of signed digital spectra and of estimation of the Doppler frequency,
Of analysis of the amplitude and of the width of the peak corresponding to said Doppler frequency;
Of computation of the value of the speed of the target and direction relative to the lidar as a function of said Doppler frequency and of the amplitude and the width of the corresponding peak.

Advantageously, the duration of the observation window depends on the atmospheric coherence time.

Advantageously, the transmission frequency is situated in the near infrared.

Advantageously, the amplitude of the variable frequency of the transmission optical signal lies between 10 MHz and 100 MHz and its modulation frequency lies between 2 kHz and 20 kHz.

Advantageously, the distance separating the lidar from the target lies between 10 m and 100 m.

BRIEF DESCRIPTION OF THE DRAWINGS

The invention will be better understood and other advantages will become apparent on reading the following description given as a nonlimiting example and from the attached figures in which.

DETAILED DESCRIPTION OF THE INVENTION

Figure 1:
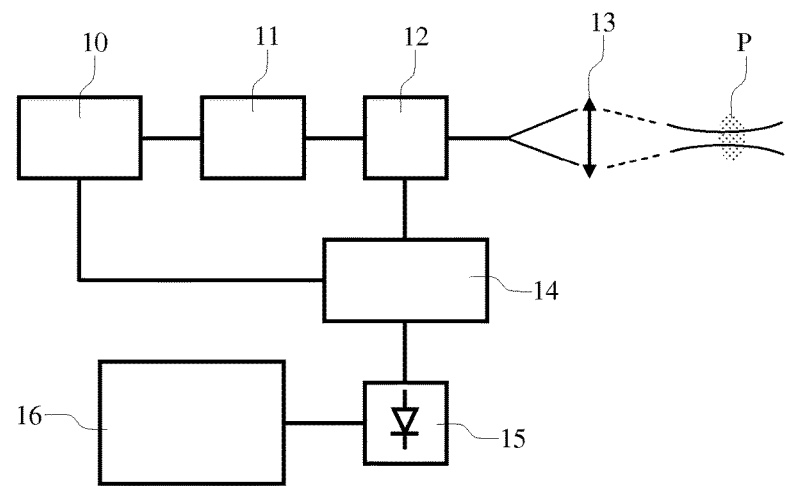
FIG. 1, already discussed, represents a first optical architecture of "CW" type of a Doppler lidar according to the prior art.
Figure 2:
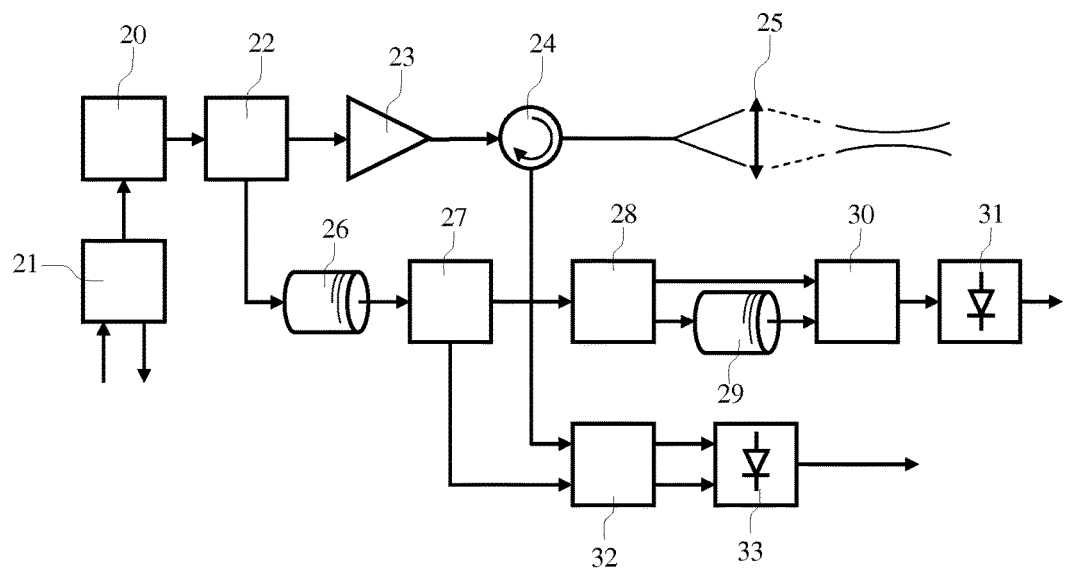
FIG. 2, already discussed, represents a second optical architecture without optical modulator of a Doppler lidar according to the prior art.
Figure 3:
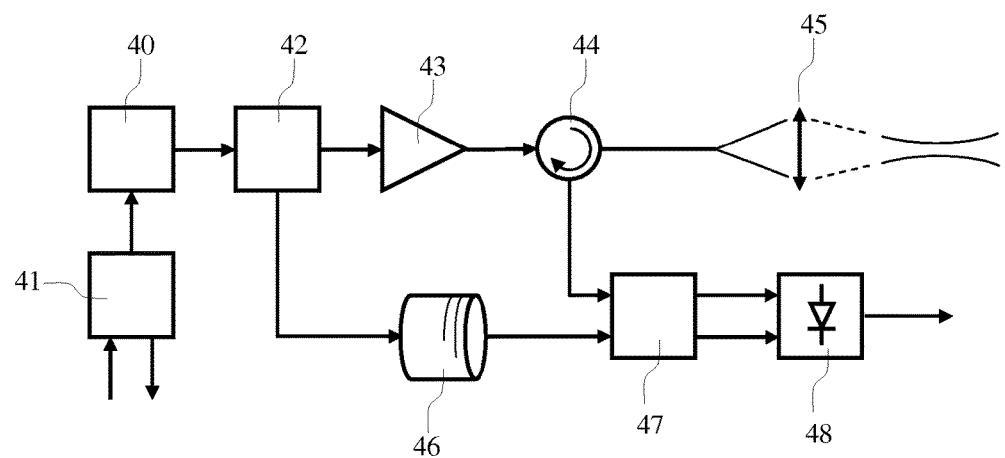
FIGS. 3 and 4 represent the block diagram of a lidar according to the invention.
Figure 4:
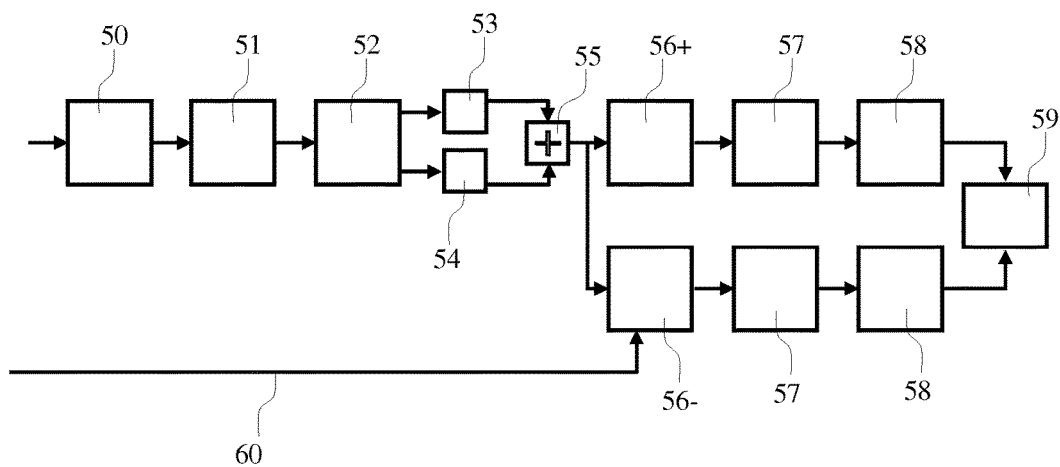

FIGS. 3 and 4 represent the block diagram of a lidar according to the invention. FIG. 3 represents the transmission and reception assemblies of the lidar. FIG. 4 represents an example of processing of the electrical signal obtained from the reception assembly.

The transmission assembly comprises a laser source 40 modulated by a frequency modulation assembly 41, the function of which is detailed below. The transmission beam passes through an optical splitter 42. A first part is amplified by the amplifier 43, passes through the circulator 44 and then is focused in the atmosphere using a transmission-reception telescope 45 at the distance D from the lidar. A second part passes through a delay line 46 of optical length equal to twice the distance and is directed to the first port of an interferometer 47.

The backscattered wave passes through the telescope 45, the circulator 44 and is directed to the second port of the interferometer 47. The beat of the two optical waves injected into the interferometer produces the electrical signal at the output of the photodetector 48.

The principle of operation of a lidar according to the invention is as follows. At a given instant t, the transmission laser 40 transmits a light wave whose optical frequency $v_{laser}(t)$ is modulated by the modulator 41. The expression of this modulation is as follows:

$$v_{laser}(t) = v_0 + A \cdot \sin(2\pi f t)$$

With $v_0$ being the carrier frequency of the optical wave
A being the amplitude of the frequency modulation
F being the modulation frequency By way of nonlimiting example, the transmission laser source can transmit in the near infrared. The frequency $v_0$ is then $1.94 \times 10^{14}$ Hz and corresponds to a wavelength $\lambda$ of 1.55 μm. The amplitude A lies between 10 MHz and 100 MHz and, more specifically, can be 50 MHz. The frequency f lies between 2 kHz and 20 kHz and, more specifically, can be 10 kHz.

When this transmitted wave reaches the target situated at the distance D, the frequency $V_{backscatter}(t)$ of the backscattered wave is, by Doppler effect:

$$V_{backscatter}(t) = V_{laser}\left(t - \frac{2D}{c}\right) + f_{Doppler}$$

c being the speed of light. D is generally a few tens of metres. In the following numerical examples, D is chosen to be equal to 25 m. The frequency $f_{Doppler}$ corresponds to the frequency Doppler shift which is:

$$f_{Doppler} = \frac{2}{\lambda} \cdot V$$

V being the speed of the target along the axis of the transmission laser beam. With the preceding wavelength of 1.55 μm, the Doppler shift frequency is 1.3 MHz for a speed of 1 m/s.

The lidar according to the invention comprises an interferometer 47 capable of ensuring a heterodyne detection, that is to say of producing an electrical signal proportional to the beat between the transmission optical wave and the backscattered optical wave. The frequency of this beat signal $f_{beat}$ is therefore, at the instant t:

$$f_{beat}(t) = |V_{backscatter}(t) - V_{laser}(t)|$$

Or even $$f_{beat}(t) = \left|A\left[\sin\left(2\pi f \cdot \left(t - \frac{2D}{c}\right)\right) - \sin(2\pi f t)\right] + f_{Doppler}\right|$$

And by replacing the difference of the two sine functions with their associated trigonometrical expression:

$$f_{beat}(t) = \left|2A \cdot \sin\left(\frac{-2\pi f D}{c}\right) \cdot \cos\left(2\pi f \cdot \left(t - \frac{D}{c}\right)\right) + f_{Doppler}\right|$$

Thus, the instantaneous frequency of the beat signal is therefore the sum of the Doppler frequency and of a modulation term. This term is modulated sinusoidally with the same modulation frequency as the transmission wave and has an amplitude modified by a factor $$2\sin\left(\frac{2\pi f D}{c}\right).$$

This factor is low and, taking the preceding numerical values, that is to say the frequency f equal to 10 kHz, D equal to 25 m and A equal to 50 MHz, the following is obtained:

$$\sin\left(\frac{2\pi f D}{c}\right) \approx 5.2 \times 10^{-3}$$

The total amplitude of the variations of the frequency of the beat signal is therefore 2.08 MHz with the preceding numerical values. The determination of the beat frequency is done conventionally by spectral or Fourier analysis.

In the absence of this modulation term, the beat frequency is strictly equal to the absolute value of the Doppler frequency and it is impossible to get back to the sign of the speed of the target relative to the lidar. By adding the modulation of the optical frequency of the laser source, it becomes possible to determine the sign of this speed. The principle consists in conducting two computations. In the first computation, the instantaneous spectrum of the received signal is realigned by adding the modulation term to the measured frequency. In the second computation, the opposite of this realignment term is added. These realignment terms are denoted $f_{realign+}$ and $f_{realign-}$. Their expressions are as follows:

$$f_{realign+}(t) = 2A \cdot \left|\sin\left(\frac{2\pi f D}{c}\right) \cdot \cos\left(2\pi f\left(t - \frac{D}{c}\right)\right)\right|$$

$$f_{realign-}(t) = -2A \cdot \left|\sin\left(\frac{2\pi f D}{c}\right) \cdot \cos\left(2\pi f\left(t - \frac{D}{c}\right)\right)\right|$$

The two spectra obtained are therefore identical but shifted relative to one another in frequency.

However, the frequency signal resulting from the beat is generally embedded in the noise for an individual spectrum. It is therefore necessary to perform a non-coherent integration over several tens of milliseconds to make it emerge from the noise. Since this integration time is long relative to the modulation of the signal, the result thereof is a spectral spreading of the ray of the signal over approximately 2 MHz. This spectral spreading is to be compared with the Doppler shift which is 1.3 MHz for a speed of 1 m/s with the same numerical data.

FIG. 4 represents a possible implementation of the heterodyne signal processing assembly according to the invention. This processing comprises two stages. A first stage for measuring the reception heterodyne signal comprising the following means:

An analogue-digital converter 50 for the electronic signal from the photodetector 48;
An observation window 51 of determined duration limiting the duration of the digital heterodyne signal;
A means 52 making it possible to perform the complex Fourier transform of the heterodyne signal;

Means 53, 54 and 55 making it possible to perform the computation of the squares of the real and imaginary parts of the Fourier transform of the digital heterodyne signal, and then sum them.

The size of the Fourier transform has to be chosen to be long enough to obtain a frequency discretization pitch of approximately one tenth of the amplitude of the expected frequency modulation. By way of example, the Gaussian width weighting window at $1/e^2$ is equal to 1 µs and the Fourier transform comprises 4096 points with a sampling frequency of approximately 400 MHz. The frequency discretization pitch is therefore of the order of 100 kHz.

A second stage for processing the spectra obtained from the first stage comprising the following means:

Two analysis chains arranged in parallel, each chain ensuring the functions of addition $56_+$ or of subtraction $56_-$ of a spectrum frequency realignment term, of accumulation 57 of a determined quantity of digital spectra, of detection and of estimation 58 of the Doppler frequency and of the amplitude of the peak corresponding to said Doppler frequency;

Means 59 for computing the value of the speed of the target and its direction relative to the lidar.

A synchronization signal 60 makes it possible to synchronize the processing chains with the frequency modulation assembly 41.

Figure 5:
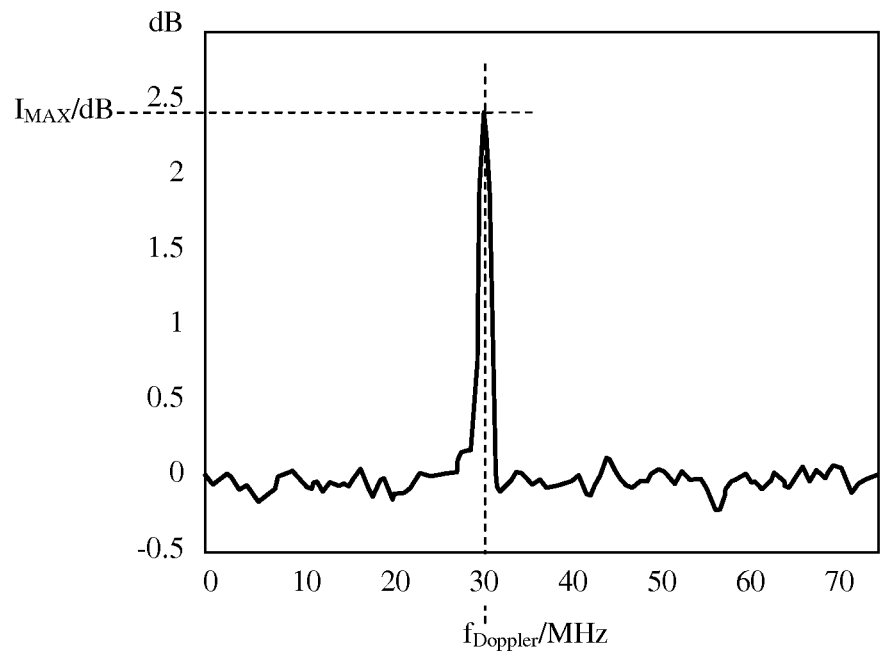
FIGS. 5, 6 and 7 represent the measurement signals in three different cases, the first without frequency realignment, the second by shifting the frequency by a positive value and the third by shifting the frequency by a negative value.
Figure 6:
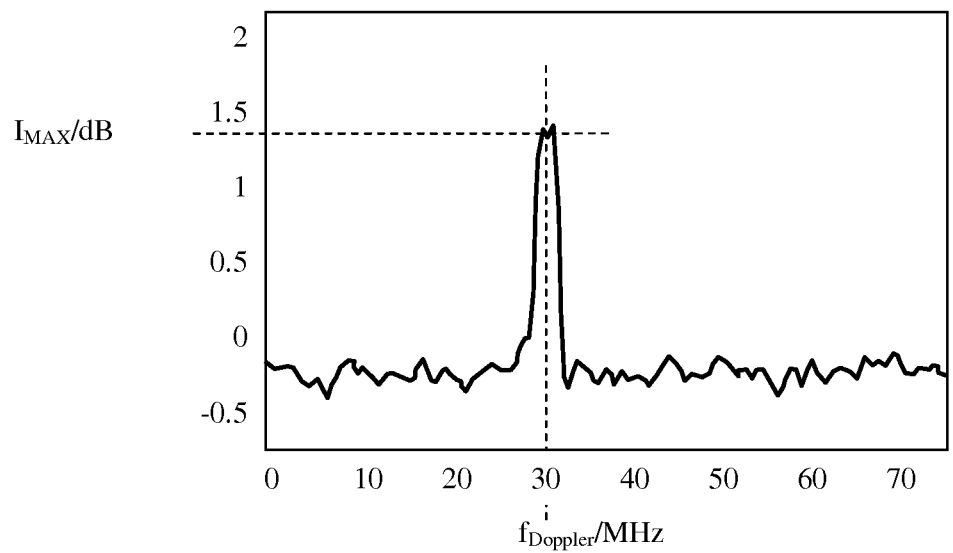
Figure 7:
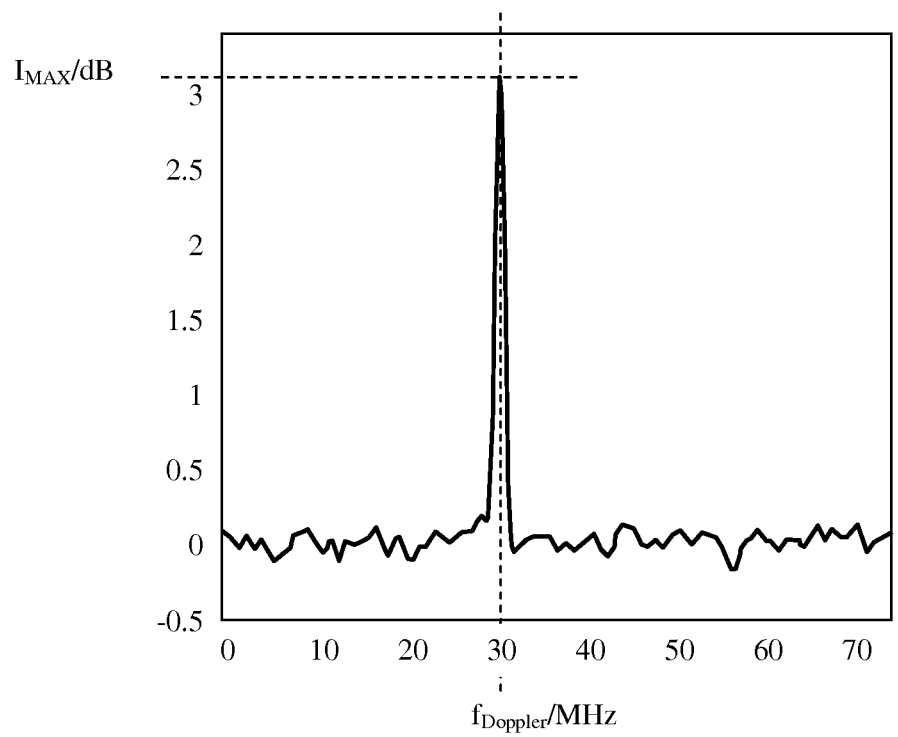

FIGS. 5, 6 and 7 represent the spectra of the measurement signals in three different cases, the first represented in FIG. 5 without frequency realignment, the second represented in FIG. 6 with the frequency shifted by a positive value and the third represented in FIG. 7 with the frequency shifted by a negative value. The positive realignment value corresponds to the assumption of a positive speed and the negative realignment value corresponds to the assumption of a negative speed. The x axis corresponds to the frequencies expressed in megahertz and the y axis corresponds to the amplitudes of the spectra expressed in decibels.

In these three examples, the speed of the target is approximately 23 m/s, which corresponds to a Doppler frequency of 30 MHz, the distance D to the target is 25 m, the frequency A is 50 MHz and the modulation frequency f is 10 kHz.

In the three cases, the spectra obtained exhibit a significant ray at the same Doppler frequency of 30 MHz. However, the amplitude $I_{MAX}$ of the rays is different. It is maximum when the realignment frequency has the same sign as the Doppler frequency. Such is the case in FIG. 7. The speed of the target is therefore negative in this example.

A simple processing is thus obtained that makes it possible to determine the direction and the value of the speed of the target relative to the lidar.

The computation of the realignment can also be performed in a single step. Indeed, since the heterodyne signal is real, its Fourier transform exhibits a Hermitian symmetry and the square of the modulus of this Fourier transform is even. The two realignments can therefore be performed in a single step by shifting the signed frequency spectrum of the received signal by the previously computed realignment term. This in effect corresponds to adding the realignment term for the positive frequencies and subtracting it as an absolute value for the negative frequencies.

This computation method also offers a second advantage. The act of shifting the spectrum corresponds mathematically to convoluting it by a Dirac distribution at the desired frequency. Such a convolution in the frequency domain corresponds to a multiplication by a complex exponential function in the time domain. It is therefore possible to produce the realignment of the spectrum in terms of signed frequencies for any value of the realignment by multiplying the heterodyne signal measured by a numerical complex exponential function at said realignment frequency before performing the Fourier transformation. All of the processing operations are then performed on the signed spectra. In the aggregated spectra, the ray corresponding to the incorrect sign of the speed exhibits a notable spectral spread which makes it possible to unambiguously choose the ray corresponding to the correct speed sign.

What is claimed is:

1. A Doppler lidar intended to measure the speed of a target, said lidar comprising at least one laser source transmitting an optical signal, optical means for transmitting said optical signal and for receiving an optical signal backscattered by said target illuminated by said optical signal, and heterodyne detection means making it possible to make the transmission optical signal and the backscattered optical signal beat and measure the beat frequency of the beat heterodyne signal, said beat frequency comprising a peak at the so-called Doppler frequency representative of the absolute speed of the target relative to the lidar, Wherein the lidar comprises:
First means for modulating the optical frequency of the optical signal so that said frequency is the sum of a constant frequency and of a variable frequency of determined amplitude modulated by a periodic temporal function;
Second means for computing the spectrum of the measured heterodyne signal and creating two measurement spectra, the first spectrum and the second spectrum being obtained by shifting the spectrum of the measured heterodyne signal by a positive and negative frequency realignment value, said realignment value being equal to the frequency difference between the instantaneous frequency of the transmission signal and the frequency of a transmission signal transmitted at a time shifted by the round-trip travel time between the lidar and the target;
Third means for comparing the two measurement spectra, the difference in form between the two spectra at the Doppler frequency making it possible to determine the direction of the speed of the target.

2. The Doppler lidar according to claim 1, wherein the second means comprise:
A first stage for measuring the reception heterodyne signal comprising the following means:
An analogue-digital converter ;
An observation window of determined duration limiting the duration of the digital heterodyne signal;
Means for performing the Fourier transform of the digital heterodyne signal and compute the square of its modulus to obtain its spectrum;
A second stage for processing the digital spectrum obtained from the first stage comprising the following means:
Two analysis chains arranged in parallel, each chain ensuring the functions of realignment of the spectrum by a positive or negative frequency value, of accumulation of a determined quantity of digital signals and of estimation of the Doppler frequency and of the amplitude of the peak corresponding to said Doppler frequency;
Means for computing the value of the speed of the target and direction relative to the lidar.

3. The Doppler lidar according to claim 1, wherein the second means comprise:
An analogue-digital converter;

An observation window of determined duration limiting the duration of the digital heterodyne signal;

A means making it possible to multiply the digital heterodyne signal by a complex exponential function of which the exponent is proportional to the realignment value to obtain a complex digital signal;

Means making it possible to perform the Fourier transform of the complex digital signal and compute the square of its modulus to obtain its spectrum;

An analysis chain ensuring the functions:

Of accumulation of a determined quantity of signed digital spectra and of estimation of the Doppler frequency, Of analysis of the amplitude and of the width of the peak corresponding to said Doppler frequency;

Of computation of the value of the speed of the target and direction relative to the lidar as a function of said Doppler frequency and of the amplitude and the width of the corresponding peak.

4. The Doppler lidar according to claim 1, wherein the duration of the observation window depends on the atmospheric coherence time.

5. The Doppler lidar according to claim 1, wherein the transmission frequency is situated in the near infrared.

6. The Doppler lidar according to claim 1, wherein the amplitude of the variable frequency of the transmission optical signal lies between 10 MHz and 100 MHz and its modulation frequency lies between 2 kHz and 20 kHz.

7. The Doppler lidar according to claim 1, wherein the distance separating the lidar from the target lies between 10 m and 100 m.

* * * * *